(12) United States Patent
Malizia

(10) Patent No.: US 6,609,686 B2
(45) Date of Patent: Aug. 26, 2003

(54) ADJUSTABLE SUPPORT APPARATUS

(75) Inventor: Mario Malizia, Castelfidardo (IT)

(73) Assignee: Tam Srl, Ricanati (IT)

( * ) Notice: Subject to any disclaimer, the term of this patent is extended or adjusted under 35 U.S.C. 154(b) by 0 days.

(21) Appl. No.: 10/052,782

(22) Filed: Jan. 18, 2002

(65) Prior Publication Data

US 2003/0136885 A1 Jul. 24, 2003

(51) Int. Cl.[7] ............................................. F16M 11/26
(52) U.S. Cl. .................. 248/125.8; 248/158; 248/161; 248/412; 248/414; 248/430
(58) Field of Search ............................ 248/125.8, 158, 248/161, 404, 410, 412, 414, 430; 135/141, 69, 75

(56) References Cited

U.S. PATENT DOCUMENTS

| 2,658,777 A | * | 11/1953 | Rauglas ..................... 403/104 |
| 3,835,486 A | * | 9/1974 | Benoit et al. ................. 5/503.1 |
| 4,318,526 A | * | 3/1982 | Werner ........................ 248/412 |
| 4,374,581 A | * | 2/1983 | Karapita ..................... 248/337 |
| 4,445,660 A | * | 5/1984 | Karapita ..................... 248/335 |
| 4,526,334 A | * | 7/1985 | Rantakari .................... 248/157 |
| 4,601,246 A | * | 7/1986 | Damico ....................... 108/146 |
| 5,078,349 A | * | 1/1992 | Smith ....................... 248/125.8 |
| 5,882,077 A | * | 3/1999 | Gebhard ...................... 297/353 |

FOREIGN PATENT DOCUMENTS

CH        655 840 A5   *   5/1986

* cited by examiner

Primary Examiner—Anita King
Assistant Examiner—Steven Marsh
(74) Attorney, Agent, or Firm—Amster, Rothstein & Ebenstein (57) ABSTRACT

An adjustable support for a microphone, lights, etc. includes a pair of elongated tubes in telescopic relationship and an engager carried by the inner tube for releasably engaging the interior surface of the outer tube. The engager includes an elongated wedge member vertically movable between locking and unlocking positions and a plurality of substantially rigid ball bearings dimensioned to releasably engage the interior surface of the outer tube against relative longitudinal movement of the tubes in a given direction when the wedge member is in the locking position and to enable such relative longitudinal movement of the tubes in the given direction when the wedge member is in the unlocking position.

16 Claims, 6 Drawing Sheets

ADJUSTABLE SUPPORT APPARATUS

BACKGROUND OF THE INVENTION

The present invention relates to an adjustable support apparatus, and in particular such apparatus which is useful for supporting items such as microphones, speakers, lights and the like.

Conventional vertically adjustable microphone stands typically utilize a rotatable collar which is threadedly secured to the upper portion of one of the telescoping sections. In order to adjust the height of such stands, it is necessary to use both hands to loosen the collar, raise or lower the upper section, and then secure the collar again by rotating it relative to the stand until it is tightened.

There are several disadvantages associated with such conventional apparatus. For example, two hands are required to adjust the height, the adjuster must typically bend over while loosening or tightening the collar (thereby making it difficult to determine the proper vertical adjustment), the collar may become loose when the microphone is rotated relative to the stand, and the like.

U.S. Pat. No. 4,671,479 discloses a portable, collapsible, adjustable support apparatus which overcomes the aforementioned disadvantages of the prior art by allowing a one-handed adjustment. First (outer) and second (inner) tubular members are telescopically connected, with a base member being attached to the lower end of the first tubular member. The second tubular member includes engagement means adapted to releasably engage the interior surface of the first tubular member. Release means carried by the second tubular member may be actuated by one hand to raise or lower the second tubular member with respect to the first tubular member. More particularly, the engagement means adjacent the lower end of the second tubular member comprises a plurality of wing members and an elongated wedge member which is vertically movable between first (lower) and second (upper) positions. Pliable rubber portions of the wing members are adapted to releasably engage the interior surface of the first tubular member when the wedge member is in the second position. The wedge member is biased to the second position in a manner such that the wing members are urged outwardly against the interior surface of the first tubular member.

Despite its advance over the conventional adjustable support apparatus requiring the use of two hands, the patented apparatus has not proven to be entirely satisfactory in use. Due to the nature of the engagement means, the pliable rubber engaging surfaces of the wing members could be worn down by repeated use, thereby rendering insecure the locking of the telescopic orientation of the tubular members and introducing the possibility of an unintended collapse to the fully telescopic orientation. Further, the nature of the engagement between the wing members and the interior surface of the first tubular member precluded easy rotation of the second tubular member (e.g., the article-bearing member) relative to the first tubular member while the tubular members were in the fixed telescopic orientation. Finally, the engagement between the wing members and the interior surface of the first tubular member did not lend itself well to use of a microphone or like article which was connected to the second tubular member by a laterally extending boom arm such that the weight of the microphone or other article was not substantially aligned with the longitudinal axis of the support apparatus (because the pliable rubber portion of one wing member would be forced against the interior surface of the first tubular member with more force than the pliable rubber portion of the other wing member, thereby leading to uneven wearing of the wing members).

A further disadvantage of the patented apparatus arose not out of the engagement means, but rather the elongated connection means which connected the wedge member (of the engagement means) and the release means carried by the second tubular member. Because the elongated connection means provided only a limited throw or vertical movement of the wedge member in response to even full actuation of the release means, a less-than-full actuation of the release means would not necessarily provide sufficient throw to enable adjustment of the telescopic orientation of the tubular members. This could prove especially disadvantageous in a public setting where the performer had other things on his mind than grasping the release mechanism with sufficient force to effect a full activation thereof.

Accordingly, it is an object of the present invention to provide an adjustable support apparatus wherein in a preferred embodiment the engagement means is formed entirely of metal so that the components thereof do not wear out.

Another object is to provide such an apparatus wherein in a preferred embodiment the engagement means permits relative rotation of the tubular members while maintaining the fixed telescopic orientation of the tubular members.

Still another object is to provide such an apparatus wherein in a preferred embodiment the engagement means precludes further telescopic action of the tubular members, yet allows further untelescoping action of the tubular members without activation of the release means.

A further object is to provide such an apparatus wherein in a preferred embodiment the engagement means is well adapted for use of the apparatus with a boom arm.

It is also an object of the present invention to provide such an apparatus wherein in a preferred embodiment the elongated connection means provides more throw upon actuation of a release member so that even a less-than-complete activation of the release means is sufficient to release the fixed telescopic orientation of the tubular members.

It is another object to provide such an apparatus which is simple and inexpensive to manufacture, use and maintain.

SUMMARY OF THE INVENTION

It has now been found that the above and related objects of the present invention are obtained in an adjustable support apparatus comprising a first (e.g., outer) elongated tubular member having upper and lower ends, and a second (e.g., inner) elongated tubular member slidably received within the upper end of the first tubular member and defining a plurality of circumferentially spaced apertures therethrough. Support means is secured to the lower end of the first tubular member. Engagement means, carried by the second tubular member for releasably engaging the interior surface of the first tubular member, includes an elongated wedge member movable between first (e.g., upper) and second (e.g., lower) positions, and a plurality of substantially rigid ball bearings rotatably seated in respective ones of the apertures in the second tubular member. The ball bearings are dimensioned to releasably engage the interior surface of the first tubular member against relative longitudinal movement between the first and second tubular members in a given direction when the wedge member is in the second position and to enable such relative longitudinal movement when the wedge member is in the first position. Biasing means bias the wedge member to the second position, thereby to normally fix or lock the relative telescopic orientation of the tubular members. Actuatable release means is carried by the second tubular member, and elongated connection means connect the wedge member and the release means such that actuation of the release means moves the wedge member longitudinally within the second tubular member from the second position to the first position.

Preferably the tubular members, the wedge member and the ball bearings are steel.

In a preferred embodiment, the ball bearings are longitudinally rotatable in a given direction (e.g., to collapse the telescopic orientation of the tubular members) only when the wedge member is in the first position, and are not longitudinally rotatable in the given direction when the wedge member is in the second position. The ball bearings are longitudinally rotatable in a direction opposite the given direction (e.g., to extend the telescopic orientation) even when the wedge member is in the second position. The ball bearings are horizontally rotatable regardless of the position of the wedge member—that is, both when the wedge member is in the first position and when the wedge member is in the second position.

In another preferred embodiment, there are three ball bearings, generally equidistantly spaced apart about a circumference of the second tubular member. The ball bearings are preferably in direct physical contact with the interior surface of the first tubular member only when the wedge member is in the second position. The first and second tubular members are generally vertically extending, and the ball bearings extend through their respective apertures with their respective centers of gravity intermediate the wedge member and their respective apertures such that the ball bearings are biased by gravity for movement towards the wedge member and away from the interior surface of the first tubular member.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 3 (consisting of FIGS. 3A and 3B) is a fragmentary schematic front elevational view showing the tubular members in a fixed telescopic orientation;

FIG. 4 is a sectional view taken along the line 4—4 of FIG. 3;

FIG. 5 (consisting of FIGS. 5A and 5B) is a fragmentary schematic front elevational view showing the tubular members in a released telescopic orientation;

FIG. 6 is a sectional view thereof taken along the line 6—6 of FIG. 5; and

DETAILED DESCRIPTION OF THE PREFERRED EMBODIMENTS

Figure 1:
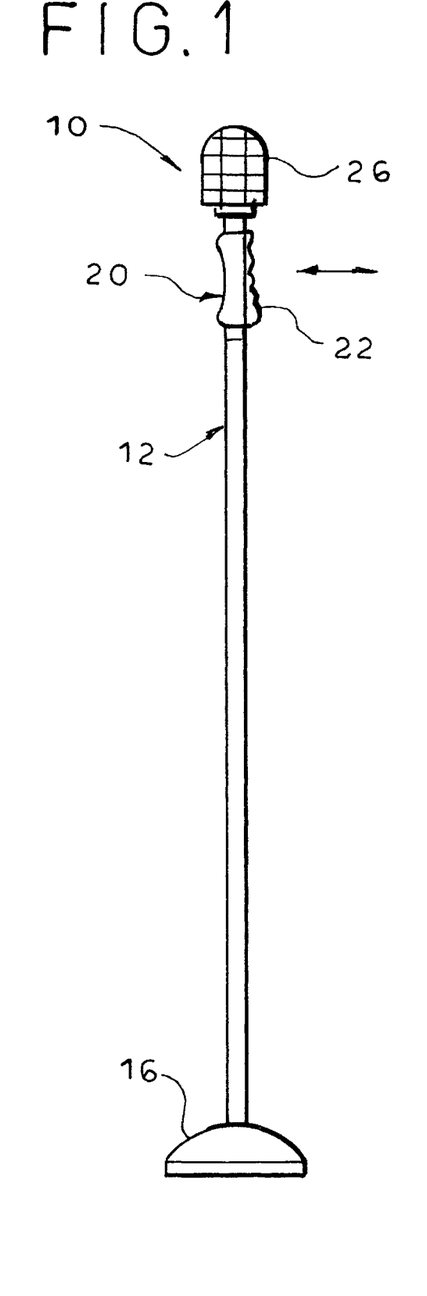
FIGS. 1 and 2 are front elevational views of an adjustable support apparatus according to the present invention in the collapsed and extended telescopic orientations, respectively.
Figure 2:
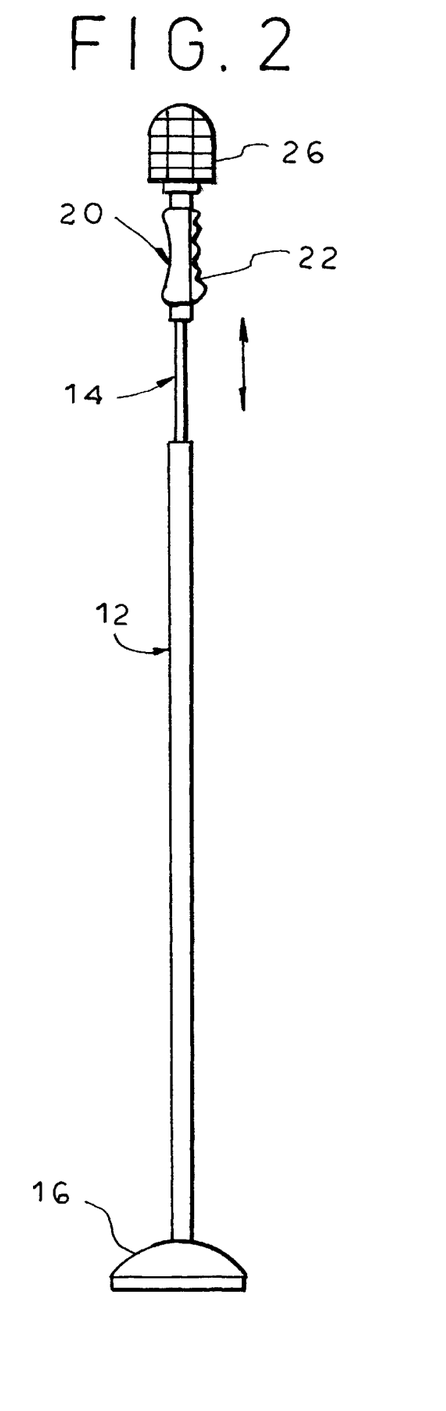

Referring now to the drawing and in particular to FIGS. 1 and 2 thereof, therein illustrated is an adjustable support apparatus according to the present invention, generally designated by the reference numeral 10. The apparatus 10 comprises a first or outer elongated tubular member, generally designated 12, having upper and lower ends, and a second or inner elongated tubular member, generally designated 14, having upper and lower ends. The lower end of the second tubular member 14 is slidably received within the upper end of the first tubular member 12.

A conventional base member 16 is secured to the lower end of the first tubular member 12. As illustrated, the base member 16 is of circular design, but various tripod and other multi-leg designs are also useful for the base member 16. The second tubular member 14 is slidably received in a reduced-diameter neck at the top of the outer member 12, the inner diameter of the neck being only slightly larger than the outer diameter of the second tubular member 14.

At the upper end of second tubular member 14 is head member 20 which includes attachment or mounting means 24, such as a threaded shank. The head member 20 also includes an actuatable release means 22, such as a lever, which is hinged at one end to the rest of head member 20 by a pin 23. The release means 22 is adapted to release the fixed telescopic engagement of the second tubular member 14 with the first tubular member 12, as explained in detail hereinafter. The threaded portion of shank 24 extending above nut 25 provides a means for attaching or mounting a desired object 26 (shown as a microphone) to the top of the head member—for example, a microphone, speaker, light, camera, telescope, etc. A power cord (not shown) leading to the attached or mounted object 26 extends downwardly along the apparatus.

Figure 3A:
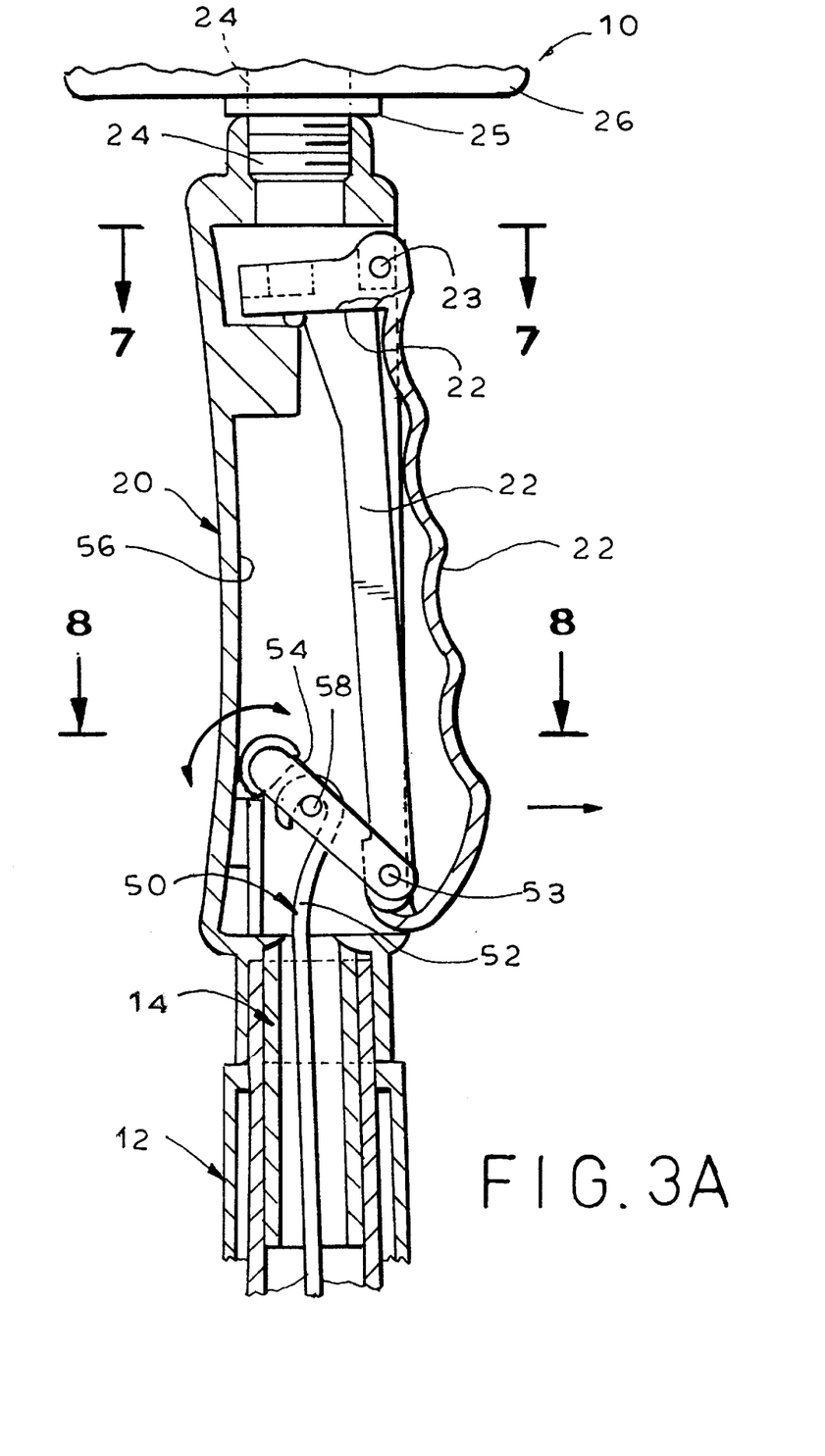
Figures 3B, 4:
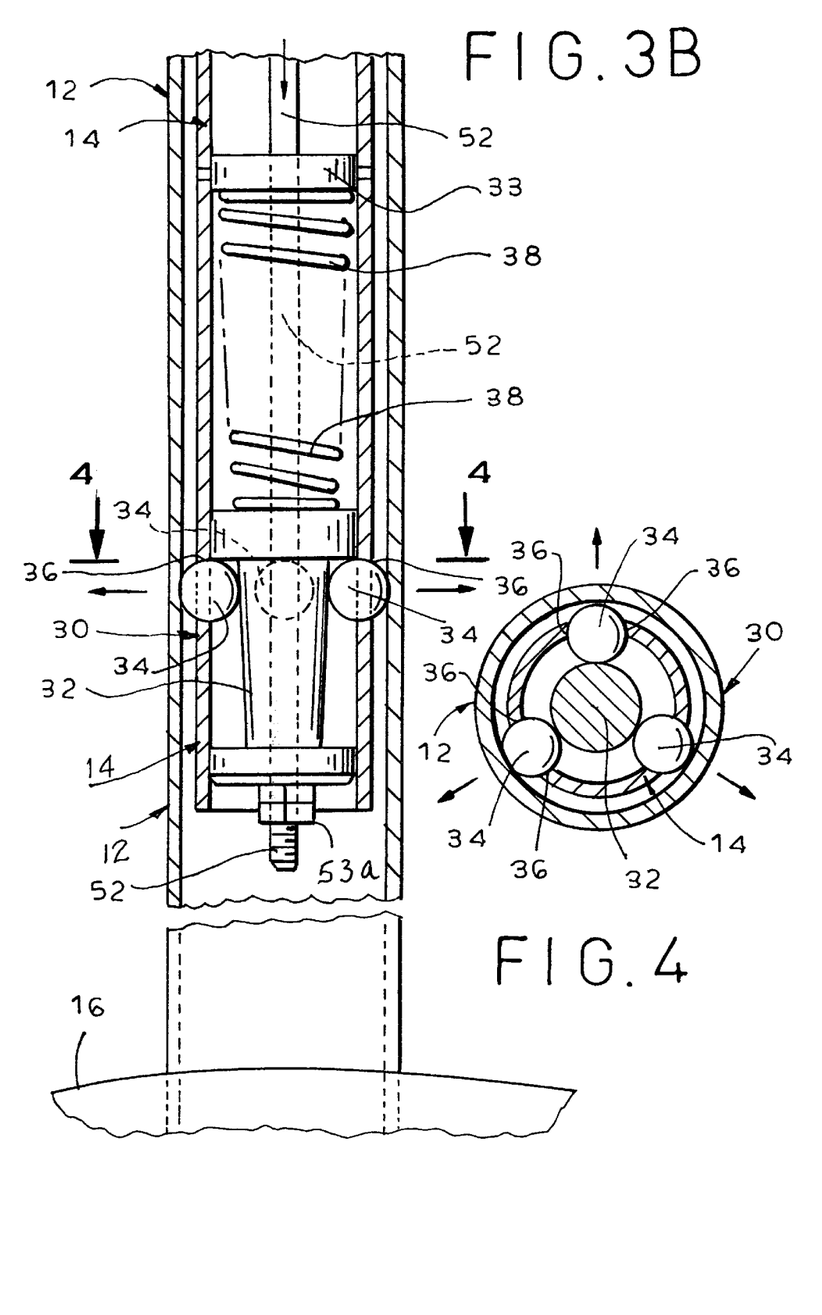
Figure 5A:
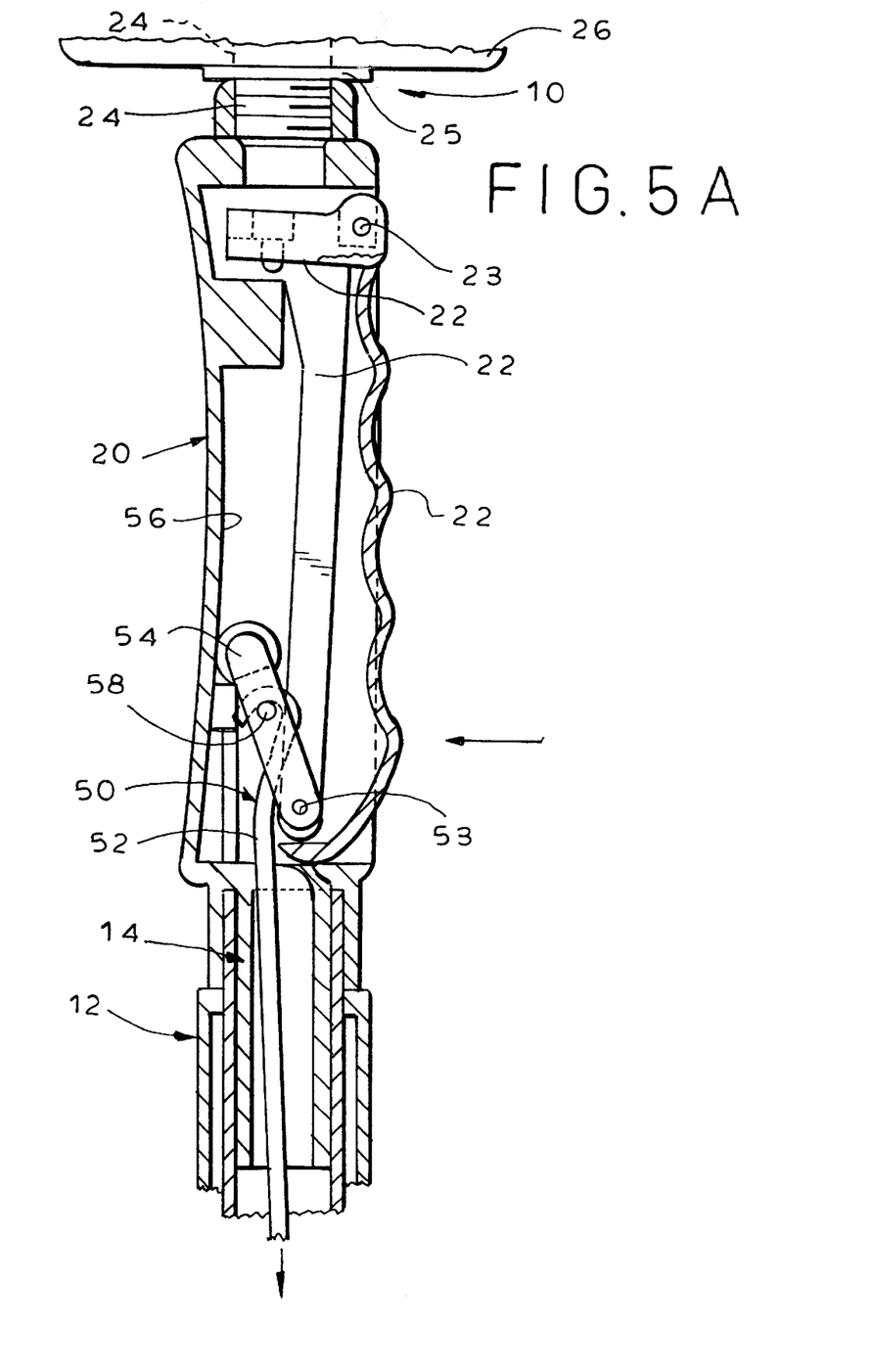
Figures 5B, 6:
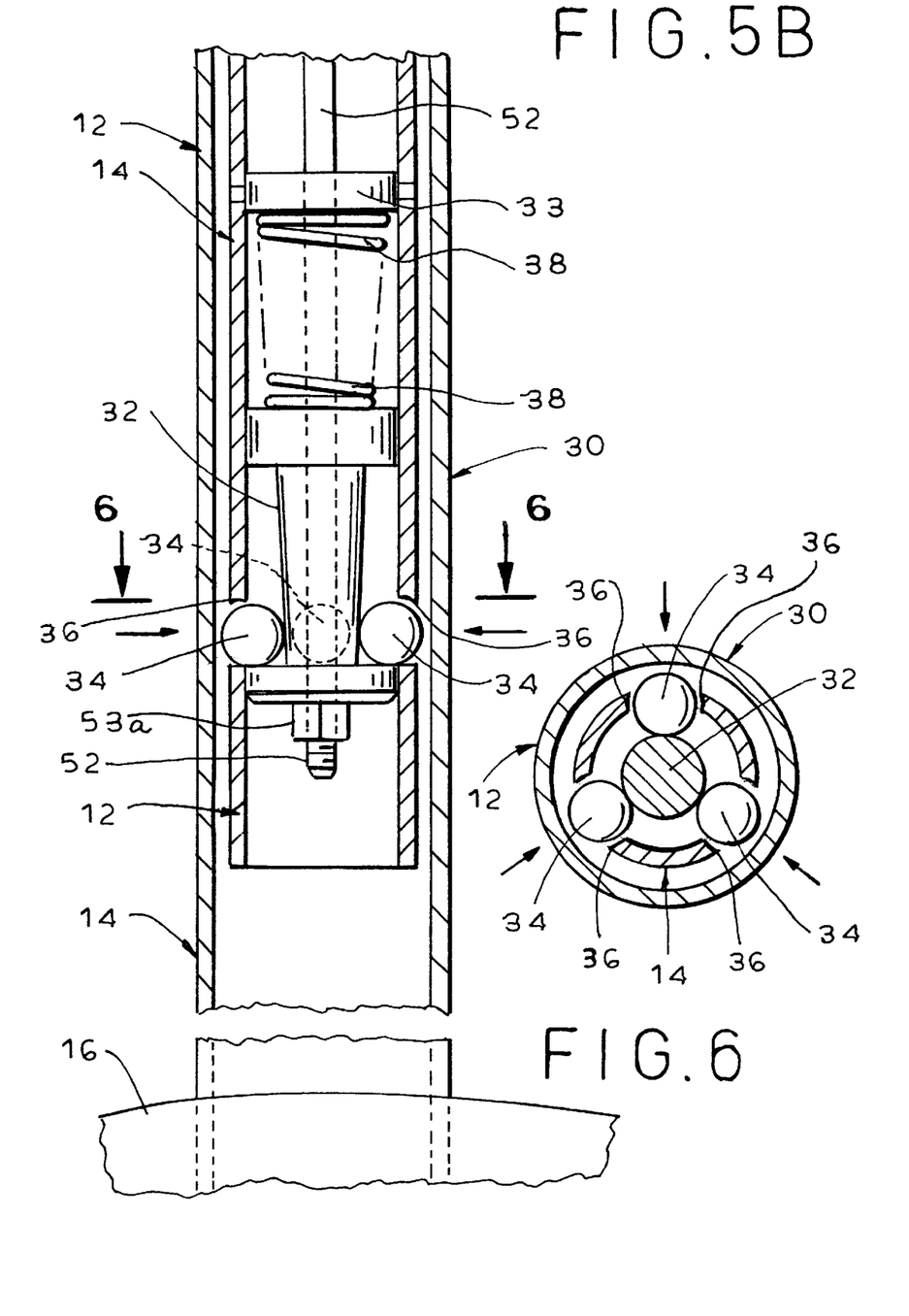
Figure 7:
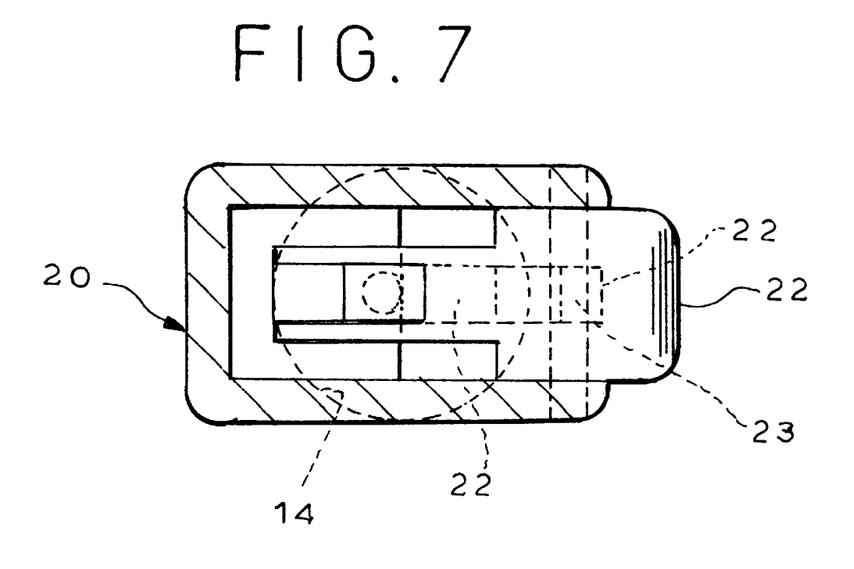
FIGS. 7 and 8 are sectional views taken along the lines 7—7 and 8—8, respectively, of FIG. 3A.
Figure 8:
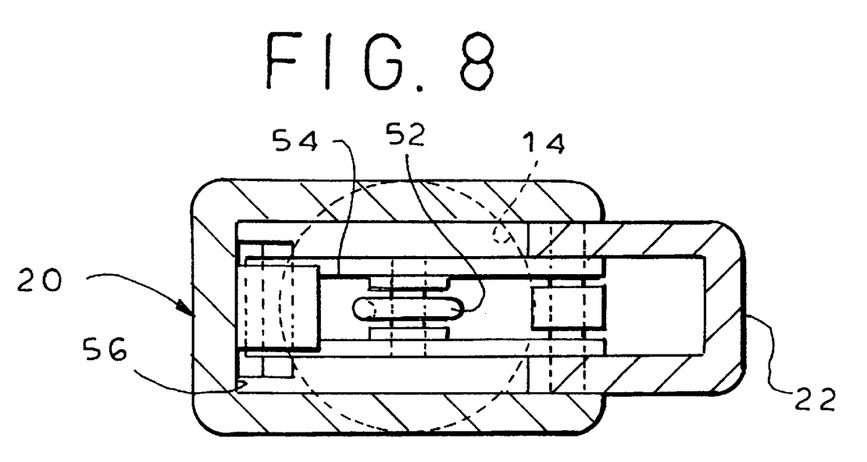

Referring now to FIGS. 3B and 5B in particular, the second tubular member 14 carries engagement means 30 for releasably engaging the interior surface of the first tubular member 12 to fix the telescopic orientation of the first and second tubular members 12, 14 and for releasably disengaging the interior surface of the first tubular member 12 so that the telescopic orientation may be varied—typically by vertical movement of the second tubular member 14 relative to the first tubular member 12. The engagement means 30 is preferably located at the lower end of second tubular member 14.

Referring now in particular to FIGS. 3B–4 and 5B–6, the engagement means 30 includes an elongated wedge member 32 movable between first and second positions (e.g., lower and upper positions), and a plurality of substantially rigid ball bearings 34. The ball bearings 34 are rotatably seated in respective ones of the apertures 36 extending through the circumferential wall of the second tubular member 14. Preferably there are at least three apertures 36 and three ball bearings 34, each being generally equidistantly spaced apart about a circumference of the second tubular member 14. The ball bearings 34 are preferably biased by gravity for movement towards the wedge member 32 and away from the interior surface of the first tubular member 12. Thus, while the first and second tubular members 12, 14 are generally vertically extending, the ball bearings 34 extend through their respective apertures 36 with their respective centers of gravity intermediate the wedge member 32 and their respective apertures 36.

The wedge member 32 is movable between first and second positions. When the wedge member 32 is in its second (e.g., lower locking) position, as illustrated in FIGS. 3 and 4, the sidewall thereof urges the ball bearings 34 outwardly against the interior surface of the first tubular member 12 to fix the telescopic orientation of the tubular members 12,14. When the wedge member 32 is in its first (e.g., raised releasing) position, as illustrated in FIGS. 5 and 6, the outer side wall of wedge member 32 allows the ball bearings 34 to move inwardly towards each other slightly (under the influence of gravity) in a manner such that they are no longer in physical contact with the inner surface of the first tubular member 12. Thus, the movement of the wedge member 32 to its first position enables relative longitudinal movement between the first and second tubular members 12, 14, thereby to enable the telescopic orientation to be varied (either by increasing or decreasing the same).

Wedge member 32 is normally biased to its second (lowered) position by biasing means 38, illustrated as a spring, so that normally the telescopic orientation of the first and second tubular members 12, 14 is fixed or locked (at least in one vertical or longitudinal direction—that is, against collapse of the telescopic orientation). The biasing means 38 bears at its top against a stop 33 secured to second tubular member 14 and at its bottom against the top of wedge member 32. When wedge member 32 is moved upwardly to its first position, the sidewall moves away from the adjacent surfaces of ball bearings 34. As a result, there is no force urging the ball bearings 34 outwardly against the interior surface of first tubular member 12, and accordingly second tubular member 14 is able to move vertically in either direction with respect to first tubular member 12, thereby to vary the magnitude of the telescopic orientation.

In a preferred embodiment, the tubular members 12, 14, the wedge member 32 and the ball bearings 34 are preferably formed of steel or a like substantially rigid material as opposed to a relatively soft rubber, nylon or plastic. As a result, when the wedge member 32 is in the second position (see FIG. 4), urging the ball bearings 34 against the inner surface of the first tubular member 12, ball bearings 34 are blocked from vertical rotation which would cause further telescoping of the tubular members 12, 14, but still enabled for vertical rotation in the opposite direction which could cause untelescoping action of the tubular members 12, 14. In other words, the ball bearings 34 are rotatable in a given direction (for collapse of the telescopic orientation) only when the wedge member 32 is in the first (raised) position of FIGS. 3 and 4 and are not rotatable in that direction when the wedge member 32 is in the second (lowered) position of FIGS. 5 and 6. On the other hand, the ball bearings 34 are rotatable in a direction opposite that given direction (for extension of the telescopic orientation), even when the wedge member 32 is in the second (lowered) position, so that the supported microphone or other article may be raised without activation of the release means 22.

The ball bearings 34 are laterally rotatable at all times, regardless of whether the wedge member 32 is in the first or second position, so that the lateral direction of the supported microphone or other article may be varied without activation of the release means 22 and hence without a loss of the fixed vertical telescopic orientation.

This being said, it will be appreciated that, when the wedge member 32 is in the second position, there may still be some resistance by the engagement means 30 to either lateral rotation of the ball bearings 34 or longitudinal rotation of the ball bearings 34 in the direction opposite the given direction (that is, in the direction of extended telescopic orientation). Ideally, however, the ball bearings 34 are in direct physical contact with the interior surface of the first tubular member 12 only when the wedge member 32 is in the second position, provided that the support apparatus is in the vertical orientation and the release mechanism 22 has achieved a full throw (or vertical movement) of the wedge member 32.

Referring now in particular to FIGS. 3A and 5A, elongated connection means, generally designated 50, connects the release means 22 at the top of the second tubular member 14 with the wedge member 32 adjacent the bottom of the second tubular member 14. Preferably the connection means 50 comprises an elongated rod 52, although it may instead be a cable, if desired. The lower end of rod 52 may be threaded so that a nut 53a may be fastened thereto to hold the wedge member 32 onto the rod 52. The upper end of rod 52 is adapted to be connected to the release means 22 via a pivotable link 54. As illustrated in FIG. 5A, manual activation of the release means 22 causes the lower end of release means 22 (to which the lower end of link 54 is pivotally connected at 53) to move inwardly and the free upper end of link 54 to travel upwardly on the inclined interior surface 56 of the head member 20, thereby lifting a central portion 58 of link 54 (to which the upper end of rod 52 is pivotally connected). This arrangement produces a greater magnitude for the throw (that is, the upward movement of the rod 52 and wedge member 32 connected thereto) than would be the case if the rod 52 were directly secured to a non-pivoting lever arm of the release means 22. Accordingly, a lesser or partially incomplete activation of the release member 22 suffices to effect the necessary throw to release the fixed telescopic orientation of the tubular members.

Referring now to FIG. 5A in particular, while there is some slight horizontal movement of the longitudinal axis of the rod 52 as the release mechanism is moved between the unactivated and activated orientations, this is of only minor consequence in view of the much greater length of the rod 52 between the head member 20 and the wedge member 32.

The adjustable support apparatus 10 of the present invention is characterized by a long operating life due to the absence of any non-metal points of wear in the engagement means 30. Unlike the conventional mechanisms which preclude adjustment of the telescopic orientation in either vertical direction or relative lateral rotation of the tubular members until the release member is activated, the present invention permits relative lateral rotation and untelescoping at all times.

To summarize, the present invention provides an adjustable support apparatus wherein the engagement means is formed entirely of metal so that the components thereof do not wear out. The engagement means prevents further telescoping action (i.e., lowering of the microphone), yet allows further untelescoping action of the tubular members (i.e., raising of the microphone), without actuation of the release means. The engagement means also permits relative rotation of the tubular members while maintaining fixed telescopic orientation of the tubular members—hat is, without actuation of the release means. The engagement means is well adapted for use of the apparatus with a boom arm. An elongated connection means provides more throw upon actuation of the release member so that even less-than-complete activation of the release means is sufficient to release the fixed telescopic orientation of the tubular members. The apparatus is simple and inexpensive to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the forgoing specification.

I claim:

1. Adjustable support apparatus comprising:
   (A) a first elongated tubular member having upper and lower ends;

(B) a support means secured to said lower end of said first tubular member;

(C) a second elongated tubular member slidably received within said upper end of said first tubular member and defining a plurality of circumferentially spaced apertures there through;

(D) engagement means carried by said second tubular member for releasably engaging the interior surface of said first tubular member, said engagement means including;

(i) an elongated wedge member movable between first and second positions;

(ii) a plurality of substantially rigid ball bearings rotatably seated in respective ones of said apertures in said second tubular member and dimensioned to releasably engage said interior surface of said first tubular member against relative longitudinal movement in a given direction between said first and second tubular members when said wedge member is in said second position and to enable such relative longitudinal movement when said wedge member is in said first position;

(E) biasing means for biasing said wedge member to said second position;

(F) activatable release means carried by said second tubular member above the top of said first tubular member; and (G) elongated connection means for connecting said wedge member and said release means such that actuation of said release means moves said wedge member longitudinally within said second tubular member from said second position to said first position.

2. The apparatus of claim 1 wherein said tubular members, said wedge member and said ball bearings are steel.

3. The apparatus of claim 1 wherein said ball bearings are longitudinally rotatable in a given direction only when said wedge member is in said first position.

4. The apparatus of claim 3 wherein said ball bearings are not longitudinally rotatable in said given direction when said wedge member is in said second position.

5. Adjustable support apparatus comprising:

(A) a first elongated tubular member having upper and lower ends;

(B) a support means secured to said lower end of said first tubular member;

(C) a second elongated tubular member slidably received within said upper end of said first tubular member and defining a plurality of circumferentially spaced apertures there through;

(D) engagement means carried by said second tubular member for releasably engaging the interior surface of said first tubular member, said engagement means including;

(i) an elongated wedge member movable between first and second positions;

(ii) a plurality of substantially rigid ball bearings rotatably seated in respective ones of said apertures in said second tubular member and dimensioned to releasably engage said interior surface of said first tubular member against relative longitudinal movement in a given direction between said first and second tubular members when said wedge member is in said second position and to enable such relative longitudinal movement when said wedge member is in said first position;

(E) biasing means for biasing said wedge member to said second position;

(F) activatable release means carried by said second tubular member; and (G) elongated connection means for connecting said wedge member and said release means such that actuation of said release means moves said wedge member longitudinally within said second tubular member from said second position to said first position;

said ball bearings being longitudinally rotatable in a direction opposite said given direction when said wedge member is in said second position.

6. The apparatus of claim 1 wherein said ball bearings are horizontally rotatable both when said wedge member is in said first position and when said wedge member is in said second position.

7. Adjustable support apparatus comprising:

(A) a first elongated tubular member having upper and lower ends;

(B) a support means secured to said lower end of said first tubular member;

(C) a second elongated tubular member slidably received within said upper end of said first tubular member and defining a plurality of circumferentially spaced apertures there through;

(D) engagement means carried by said second tubular member for releasably engaging the interior surface of said first tubular member, said engagement means including;

(i) an elongated wedge member movable between first and second positions;

(ii) a plurality of substantially rigid ball bearings rotatably seated in respective ones of said apertures in said second tubular member and dimensioned to releasably engage said interior surface of said first tubular member against relative longitudinal movement in a given direction between said first and second tubular members when said wedge member is in said second position and to enable such relative longitudinal movement when said wedge member is in said first position;

(E) biasing means for biasing said wedge member to said second position;

(F) activatable release means carried by said second tubular member; and (G) elongated connection means for connecting said wedge member and said release means such that actuation of said release means moves said wedge member longitudinally within said second tubular member from said second position to said first position;

said ball bearings being in direct physical contact with said interior surface of said first tubular member only when said wedge member is in said second position.

8. The apparatus of claim 1 wherein said plurality of said ball bearings is three, generally equidistantly spaced apart about a circumference of said second tubular member.

9. Adjustable support apparatus comprising:

(A) a first elongated tubular member having upper and lower ends;

(B) a support means secured to said lower end of said first tubular member;

(C) a second elongated tubular member slidably received within said upper end of said first tubular member and defining a plurality of circumferentially spaced apertures there through;

(D) engagement means carried by said second tubular member for releasably engaging the interior surface of said first tubular member, said engagement means including;
  (i) an elongated wedge member movable between first and second positions;
  (ii) a plurality of substantially rigid ball bearings rotatably seated in respective ones of said apertures in said second tubular member and dimensioned to releasably engage said interior surface of said first tubular member against relative longitudinal movement in a given direction between said first and second tubular members when said wedge member is in said second position and to enable such relative longitudinal movement when said wedge member is in said first position;
(E) biasing means for biasing said wedge member to said second position;
(F) activatable release means carried by said second tubular member; and
(G) elongated connection means for connecting said wedge member and said release means such that actuation of said release means moves said wedge member longitudinally within said second tubular member from said second position to said first position;
  said ball bearings being biased by gravity for movement towards said wedge member and away from said interior surface of said first tubular member.

10. The apparatus of claim 9 wherein said first and second tubular members are generally vertically extending, and said ball bearings extend through their respective apertures with their respective centers of gravity intermediate said wedge member and their respective apertures.

11. The apparatus of claim 1 wherein said ball bearings are longitudinally rotatable in a given direction only when said wedge member is in said first position, and are not longitudinally rotatable in said given direction when said wedge member is in said second position; said ball bearings being longitudinally rotatable in a direction opposite said given direction when said wedge member is in said second position; and said ball bearings being horizontally rotatable both when said wedge member is in said first position and when said wedge member is in said second position.

12. The apparatus of claim 1 wherein said ball bearings are in direct physical contact with said interior surface of said first tubular member only when said wedge member is in said second position, said plurality of said ball bearings being three, generally equidistantly spaced apart about a circumference of said second tubular member.

13. The apparatus of claim 1 wherein said first and second tubular members are generally vertically extending, and said ball bearings extend through their respective apertures with their respective centers of gravity intermediate said wedge member and their respective apertures such that said ball bearings are biased by gravity for movement towards said wedge member and away from said interior surface of said first tubular member.

14. Adjustable support apparatus comprising:
(A) a first elongated tubular member having upper and lower ends;
(B) a support means secured to said lower end of said first tubular member;
(C) a second elongated tubular member slidably received within said upper end of said first tubular member and defining a plurality of circumferentially spaced apertures there through;
(D) engagement means carried by said second tubular member for releasably engaging the interior surface of said first tubular member, said engagement means including;
  (i) an elongated wedge member movable between first and second positions;
  (ii) a plurality of substantially rigid ball bearings rotatably seated in respective ones of said apertures in said second tubular member and dimensioned to releasably engage said interior surface of said first tubular member against relative longitudinal movement in a given direction between said first and second tubular members when said wedge member is in said second position and to enable such relative longitudinal movement when said wedge member is in said first position;
(E) biasing means for biasing said wedge member to said second position;
(F) activatable release means carried by said second tubular member;
(G) elongated connection means for connecting said wedge member and said release means such that actuation of said release means moves said wedge member longitudinally within said second tubular member from said second position to said first position; and
(H) a hollow head member carried by said second tubular member and having therein an elongate link, said elongate link having one link end pivotably connected to said release means, the other link end free for upward travel on an interior surface of said head member, and a body portion intermediate said link ends, said link body portion being pivotably secured to said elongated connection means for lifting said wedge member to said first position upon activation of said release means.

15. Adjustable support apparatus comprising:
(A) a first elongated tubular member having upper and lower ends;
(B) support means secured to said lower end of said first tubular member;
(C) a second elongated tubular member slidably received within said upper end of said first tubular member and defining a plurality of circumferentially spaced apertures there through;
(D) engagement means carried by said second tubular member for releasably engaging the interior surface of said first tubular member, said engagement means including;
  (i) an elongated wedge member movable between first and second positions;
  (ii) a plurality of substantially rigid ball bearings rotatably seated in respective ones of said apertures in said second tubular member and dimensioned to releasably engage said interior surface of said first tubular member against relative longitudinal movement in a given direction between said first and second tubular members when said wedge member is in said second position and to enable such relative longitudinal movement when said wedge member is in said first position;
(E) biasing means for biasing said wedge member to said second position;
(F) activatable release means carried by said second tubular member; and
(G) elongated connection means for connecting said wedge member and said release means such that actuation of said release means moves said wedge member longitudinally within said second tubular member from said second position to said first position;

said tubular members, said wedge member and said ball bearings being formed of metal;

said ball bearings being longitudinally rotatable in a given direction only when said wedge member is in said first position, and not being longitudinally rotatable in said given direction when said wedge member is in said second position, said ball bearings being longitudinally rotatable in a direction opposite said given direction when said wedge member is in said second position, and said ball bearings being horizontally rotatable both when said wedge member is in said first position and when said wedge member is in said second position;

said ball bearings being in direct physical contact with said interior surface of said first tubular member only when said wedge member is in said second position, said first and second tubular members being generally vertically extending, and said ball bearings extending through their respective apertures with their respective centers of gravity intermediate said wedge member and their respective apertures such that said ball bearings are biased by gravity for movement towards said wedge member and away from said interior surface of said first tubular member.

16. The apparatus of claim 15 additionally including a hollow head member carried by said second tubular member and having therein an elongate link, said elongate link having one link end pivotably connected to said release means, the other link end free for upward travel on an interior surface of said head member, and a body portion intermediate said link ends, said link body portion being pivotably secured to said elongated connection means for lifting said wedge member to said first position upon activation of said release means.

* * * * *